UNITED STATES PATENT OFFICE.

ADOLF GENTZSCH, OF VIENNA, AUSTRIA-HUNGARY.

UTILIZATION OF WASTE RUBBER.

951,811.

Specification of Letters Patent. Patented Mar. 15, 1910.

No Drawing. Application filed October 30, 1903. Serial No. 341,843.

*To all whom it may concern:*

Be it known that I, ADOLF GENTZSCH, mineralogist, a subject of the Emperor of Germany, and a resident of VII Stiftgasse 1, Vienna, in the Empire of Austria-Hungary, have invented Improvements Relating to the Utilization of Waste Rubber; and I do hereby declare the following to be a full, clear, and exact description of the invention, such as will enable others skilled in the art to which it appertains to make and use the same.

All processes and experiments heretofore undertaken for reclaiming the rubber or rubber substitutes from old vulcanized rubber which has become hard or friable or useless have culminated in the endeavor principally to eliminate the sulfur from the mass to be treated, either wholly or in part by dissolving the rubber in an appropriate solvent of about 5 to 30 times the weight of the rubber, in order first of all to separate the sulfur, and then to reclaim the rubber by evaporating the solvent. It is likewise known to leave the solvent (of the india rubber) in the mass, and to vulcanize the mixture subsequently (see for example German patent No. 109827). Now, contrary to the methods hitherto adopted, in accordance with the present invention the old rubber, after having been divided into small particles or pulverized, is intimately mixed, not with from 5 to 30 times its weight, but only with approximately a fifth to a tenth part of its weight with anilin, and either in open or closed vessels it is brought, preferably with the assistance of an oil or air, steam, or sand bath, for about a quarter of an hour to ¾ of an hour (according to the quantity to be treated) to a temperature of, say 130° to 160° C. for the purpose of softening the rubber. When the mixture has become soft it is treated in the usual manner by the known mixing or masticating rollers, and results in a product closely approaching new rubber, both as regards its elasticity and also all its other properties. This novel material may be vulcanized in the usual manner without sulfur or with only small quantities of sulfur, and (which is most important) such reclaimed rubber when it has again been worn out may be re-submitted to the treatment described, and is again capable of vulcanization without any addition of sulfur.

It should be stated that the anilin bases and solid hydrocarbons are well known solvents for india rubber (see for example German patent No. 99689 or British patent No. 3855/02) but only in the large quantities already referred to, and not as in the present invention in such small quantities, and with the object of dissolving not the india rubber but the sulfur for the duration of the process of regeneration.

Experiments have shown that by mixing vulcanized waste rubber with anilin in substantially the proportions specified, and subjecting the mixture to the temperature approximately as specified, the anilin is absorbed by the rubber and permanently retained therein. The experiments further tend to show that the waste rubber and anilin enter into a loose chemical combination, since the anilin is held in the rubber with great tenacity. Whether the combination is a true chemical combination or not can not be ascertained, and, therefore, I do not intend to be understood as advancing the above theory as the only one, but it is merely advanced from the results obtained. The experiments, however, show that the rubber holds the anilin with great tenacity and forms a compound with the anilin. The result of the process is, therefore, a compound consisting of waste rubber and anilin. The anilin remains in and forms a compound with the waste rubber, as distinguished from those processes and compounds in which the anilin is used only as a solvent and afterward separated.

Vulcanized waste rubber which has been reclaimed by the process herein specified, is found to possess a characteristic which is considered the peculiar property of new rubber, that is, the capability of reuniting freshly cut surfaces by the application of pressure alone.

Having thus described the process and the compound produced by the process, what I claim is:—

1. The herein described process of reclaiming waste rubber, which consists in mixing waste rubber with anilin and heating the mixture to a temperature sufficient to cause said waste rubber to absorb, enter into a loose combination with and retain the anilin.

2. The herein described process of reclaiming waste rubber which consists in mixing waste rubber with one tenth to one fifth of its weight of anilin and heating the mixture to a temperature sufficient to cause said waste rubber to absorb, enter into a loose combination with and retain the anilin.

3. The herein described process of reclaiming waste rubber which consists in mixing waste rubber with anilin and heating the mixture to a temperature over 130 degrees centigrade to cause said waste rubber to absorb, enter into a loose combination with and retain the anilin.

4. The herein described process of reclaiming rubber, which consists in mixing waste rubber with one tenth to one fifth of its weight of anilin and heating the mixture at a temperature of 130 degrees centigrade to 160 degrees centigrade to cause said waste rubber to absorb, enter into a loose combination with and retain the anilin.

5. The herein described reclaimed waste rubber compound, consisting of a mixture of waste rubber and anilin, the anilin being absorbed, in a loose combination with and retained by the rubber.

6. The herein described reclaimed waste rubber compound, consisting of a mixture of waste rubber and one-tenth to one-fifth of its weight of anilin, the anilin being absorbed, in a loose combination with and retained by the rubber.

In testimony whereof I have signed my name to this specification in the presence of two subscribing witnesses.

ADOLF GENTZSCH.

Witnesses:
W. A. RUBLEE,
AUGUST FUGGER.